(12) United States Patent
Jo

(10) Patent No.: US 11,776,230 B2
(45) Date of Patent: Oct. 3, 2023

(54) METHOD FOR PRODUCING A SEGMENTED ACTUAL STATE MODEL

(71) Applicant: CA-DIGITAL GMBH, Hilden (DE)

(72) Inventor: Yong-Min Jo, Duesseldorf (DE)

(73) Assignee: CA-DIGITAL GmbH, Hilden (DE)

( * ) Notice: Subject to any disclaimer, the term of this patent is extended or adjusted under 35 U.S.C. 154(b) by 0 days.

(21) Appl. No.: 17/550,229

(22) Filed: Dec. 14, 2021

(65) Prior Publication Data

US 2022/0245909 A1 Aug. 4, 2022

Related U.S. Application Data

(63) Continuation of application No. PCT/EP2020/066256, filed on Jun. 12, 2020.

(51) Int. Cl.

| G06T 15/00 | (2011.01) |
|---|---|
| G06T 19/20 | (2011.01) |
| G06T 7/33 | (2017.01) |
| A61C 13/34 | (2006.01) |

(52) U.S. Cl.
CPC ............. G06T 19/20 (2013.01); A61C 13/34 (2013.01); G06T 7/344 (2017.01); G06T 2207/30036 (2013.01); G06T 2210/12 (2013.01); G06T 2219/2004 (2013.01); G06T 2219/2016 (2013.01)

(58) Field of Classification Search
CPC ....... A61C 13/004; A61C 7/12; A61C 19/045; A61C 13/082; A61C 5/40; G16H 40/20; G16H 50/50; G06T 17/00; G06T 2210/41; G06T 19/20; G06T 2219/028; G06T 19/00

USPC .......................................................... 345/418
See application file for complete search history.

(56) References Cited

U.S. PATENT DOCUMENTS

| 9,421,074 B2 * | 8/2016 | Sachdeva ............. A61B 5/0088 |
| 11,357,599 B1 * | 6/2022 | Jo .......................... B33Y 50/00 |
| 2010/0280798 A1 | 11/2010 | Pattijn et al. |
| 2019/0337199 A1 * | 11/2019 | Jo .......................... B29C 43/50 |

FOREIGN PATENT DOCUMENTS

| DE | 102013217676 A1 | 3/2015 |
| DE | 102017121451 A1 | 3/2019 |

* cited by examiner

Primary Examiner — Phu K Nguyen
(74) Attorney, Agent, or Firm — Von Rohrscheidt Patents

(57) ABSTRACT

A method for producing a current state model of teeth of a patient from a scan of the teeth, the method including providing an old model of the teeth including first surface elements wherein each of the first surface elements is associated with precisely one tooth of the teeth to form a segmented old model of the teeth; initially bringing the scan and the old model into a coarse alignment; thereafter determining a bounding volume of at least one of the teeth in the old model; thereafter determining second surface elements in the scan of the teeth arranged within the bounding volume; thereafter copying copies of the first surface elements associated with the at least one of the teeth from the old model into a current state model; thereafter aligning the copies in the current state model with a minimum deviation from the second surface elements.

5 Claims, 1 Drawing Sheet

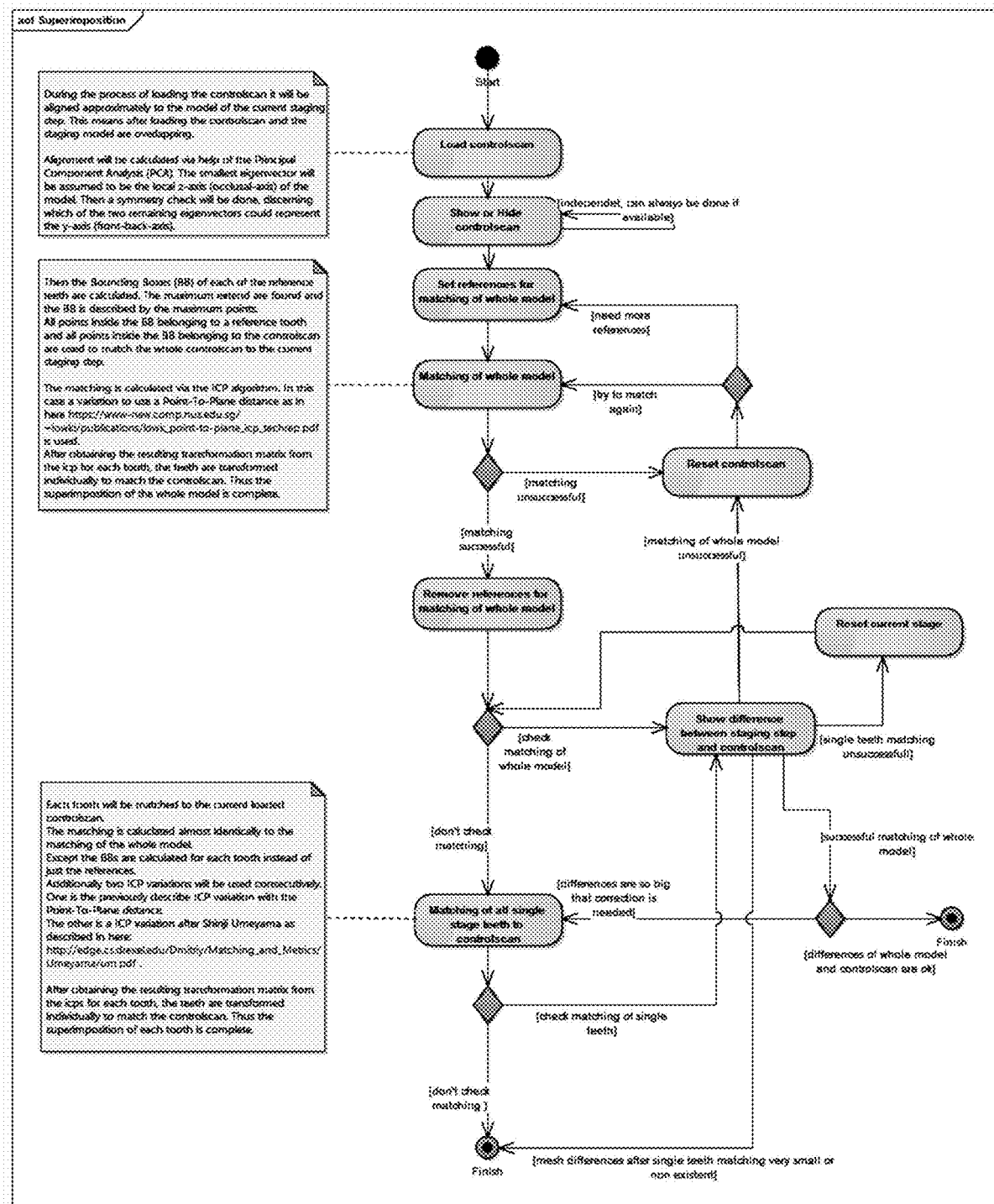

METHOD FOR PRODUCING A SEGMENTED ACTUAL STATE MODEL

RELATED APPLICATIONS

This application is a continuation of International Application PCT/EP2020/066255 filed on Jun. 12, 2020 claiming Priority from German Patent Application DE 10 2019 116 198.3 filed Jun. 14, 2019, both of which are incorporated in their entirety by this reference. International Application PCT/EP2020/065815 filed on Jun. 8, 2020 and U.S. application Ser. No. 17/548,670 filed on Dec. 13, 2021 by applicant are incorporated in their entirety by this reference.

FIELD OF THE INVENTION

The invention relates to a method for producing a segmented current state model of teeth of a patient in which each surface segment is associated with precisely one tooth of teeth from a scan of the teeth.

BACKGROUND OF THE INVENTION

Segmented models of teeth of a patient, thus virtual models in which each surface element is associated with precisely one tooth of the patient are well known as a basis for producing braces or aligners for correcting tooth misalignments.

In the known methods a segmented model is produced from a 3D scan of a jaw of the patient by associating the scanned surface elements, thus points and/or surface elements of the scan manually or semi-automatically with individual teeth.

BRIEF SUMMARY OF THE INVENTION

Thus, it is an object of the invention to simplify producing a segmented model.

The object is achieved by a method for producing a current state model of teeth of a patient from a scan of the teeth, the method including providing an old model of the teeth including first surface elements wherein each of the first surface elements is associated with precisely one tooth of the teeth to form a segmented old model of the teeth; initially bringing the scan and the old model into a coarse alignment; thereafter determining a bounding volume of at least one of the teeth in the old model; thereafter determining second surface elements in the scan of the teeth arranged within the bounding volume; thereafter copying copies of the first surface elements associated with the at least one of the teeth from the old model into a current state model; thereafter aligning the copies of the first surface elements in the current state model with a minimum deviation from the second surface elements; and thereafter associating the copies of the first the surface elements with the at least one of the teeth from the scan to form a segmented current state model of the teeth.

Improving upon the known method it is proposed according to the invention that an enveloping body of at least one of the teeth is determined in a segmented old model of the teeth, associating surface elements that are arranged in the enveloping body in the scan of the teeth with the at least one of the teeth and then aligning the at least one of the teeth from the old model in the current state model with a minimum deviation from the associated surface elements. The method according to the invention facilitates automatically producing a segmented current state model from a scan based on a segmented old model that slightly differs from the scan using a 3D shape alignment method for aligning three dimensional surfaces.

The inventors have found that a position of teeth in a jaw of a patient can change during treatment, however the surfaces of an individual tooth remain unchanged relative to the displacements or remain very similar. According to the invention teeth that are already defined in the segmented old model and surface elements associated with the teeth are being reused and are merely moved into the position that has changed in the current scan. This automation significantly accelerates and simplifies producing current segmented current state models during an orthodontic treatment.

Advantageously the method according to the invention initially brings the scan and the old model into a coarse alignment. After the first coarse alignment the scan and the old model overlap. Advantageously the scan or the old model are rotated and/or moved in a linear manner with respect to three axes in space in order to perform the alignment. Further advantageously main components of the scan and of the old model are determined and aligned relative to each other to perform in alignment. Determining the main components, in particular main axes of an object in space and its position change by rotating about the 3 axes in space and moving the object about and along the three axes in space can be performed by simple algorithms that are well known. Alternatively the scan and the old model can be aligned relative to each other manually.

Advantageously, the enveloping body used by the method according to the invention is a cuboid. A cuboid bounding volume of a tooth can be determined by simple algorithms from the coordinates of points of the surface elements associated with the tooth that have a maximum distance from each other along the three axes in space. After the coarse alignment of the old model and the scan relative to each other typically a sufficient number of surface elements of the scan that are associated with the respective tooth are arranged in the bounding volumes in order to determine the tooth in the scan from the old model and to align the tooth in the scan with the old model The bounding volume can be automatically increased in size in order to more completely capture surface elements of a tooth whose position has changed in the scan relative to the old model. Limiting to the surface elements of the tooth from the scan to the surface elements arranged in the bounding volume significantly simplifies and accelerates the determination of the associated tooth from the old model.

Advantageously reference teeth are selected from the teeth according to the method according to the invention and surface elements are associated with the reference teeth and the old model is aligned in the current state model so that the reference teeth from the old model have a minimum deviation from the associated surface elements. After the coarse alignment based on the main components the alignment of the old model and the scan relative to each other is improved based on the reference teeth and in particular the number of the surface elements which are associated with the teeth through the bounding volumes is significantly increased. Advantageously teeth that are typically less prone to tooth misalignments, in particular molars are automatically proposed as reference teeth.

Advantageously the method according to the invention associates surface elements precisely with one of the teeth and the respective tooth from the old model is aligned in the current state model with a minimum deviation from the associated surface elements. Aligning the individual teeth from the old model with the associated surface elements of the scan generates a segmented current state model with teeth in a position in space respectively determined in the scan.

Advantageously, the old model is a surface model when applying the method according to the invention. A surface model provides a basis for graphical representations as well as for automatic comparisons with other models, thus also for producing physical models, in particular by rapid prototyping, e.g. 3D printing.

BRIEF DESCRIPTION OF THE DRAWINGS

The drawing FIGURE shows a flow chart of a scan alignment by principal component analysis according to the invention.

DETAILED DESCRIPTION OF THE INVENTION

During an orthodontic treatment of a tooth misalignment using an individually produced aligner, a jaw of a patient is scanned by an intra oral scanner in order to check treatment progress. The scan generated in the intra oral scanner is a 3-dimensional cloud of points in space.

The aligner was produced by arranging the teeth of the patient in the respectively desired nominal position in a segmented old model, producing a real physical model from the old model by 3D printing and deep drawing a foil over the real model and curing the foil. The old model is a 3-dimensional surface model from a prior scan whose surface elements were associated with the individual teeth. A respective tooth type is assigned to the teeth in the old model and intra oral surfaces that are missing in the scan are interpolated in order to close the gaps in the surfaces and the missing tooth roots where extrapolated based on the tooth types.

Initially linear independent eigen vectors of the scan as well as of the old model are computed by principal components analysis (PCA). The respectively shortest eigen vector is associated with the local z-axis (in the jaw upward occlusal axis perpendicular to the chewing surface). By symmetry testing the respective other eigen vectors are associated with the y-axis (in the jaw the dorsal direction) and the x-axis. Then the scan and the old model are superimposed so that the eigen vectors coincide and both already overlap to a large extent.

In the next step, the outer molars of the old model are automatically selected as reference teeth and the coordinates that respectively have maximum distance from each other in the three directions in space are determined that define a cuboid bounding volume. Then all points of the scan selected that are arranged within the bounding volumes and the old model in its entirety is arranged in iterative steps so that the reference teeth deviate from the selected points by a minimum amount. In order to determine the displacement a modified iterative closest point algorithm is being used as described in Low K-L: Linear Least-Squares Optimization for Point-to-Plane ICP Surface Registration. University of North Carolina 2004.

Thereafter, the respective bounding volumes for each other teeth are determined. The points of the scan located in the respective bounding volumes are selected and each tooth is individually arranged so that it deviates from the respectively selected points by a minimum amount. In order to determine the linear displacement, two different modified ICP algorithms are used in sequence, namely the algorithm described supra and the algorithm described in Umeyama, S: Least-Squares Estimation of Transformation Parameters Between Two Point Patterns IEEE. PAMI 1991.

In order to provide an optical representation of the treatment progress the teeth of the current state model are colored in a representation with a color scale from green to red based on their Hausdorff distance from the respective tooth of the old model. When the position of the tooth in the current state model and in the old model coincide then the tooth has reached its desired nominal position and is colored green. With a changing distance the coloration changes towards red.

What is claimed is:

1. A method for producing a current state model of teeth of a patient from a scan of the teeth including at least one of the teeth, the method comprising:
    providing an old model of the teeth including first surface elements wherein each of the first surface elements is associated with precisely one tooth of the teeth to form a segmented old model of the teeth;
    initially capturing the scan of the teeth that differs from the segmented old model of the teeth; thereafter;
    bringing, the scan of the teeth and the segmented old model of the teeth into a first alignment by principal component analysis wherein an entirety of the scan is moved relative to an entirety of the segmented old model to form an aligned scan; thereafter
    determining a bounding volume of the at least one of the teeth in the segmented old model; thereafter
    determining second surface elements in the aligned scan of the teeth arranged within the bounding volume; thereafter
    copying copies of the first surface elements associated with the at least one of the teeth from the segmented old model into the aligned scan to form a current state model; thereafter
    aligning the copies of the first surface elements in the current state model with a minimum deviation from the second surface elements by an interactive closest point algorithm;
    to form a segmented current state model of the teeth from aligned copies of the first surface elements.

2. The method according to claim 1, wherein the scan or the old model are rotated or displaced relative to three axes in space in order to perform the first alignment.

3. The method according to claim 1, wherein principal components of the scan and of the old model are determined using principal component analysis and aligned with each other in order to perform the first alignment.

4. The method according to claim 1, wherein the bounding volume is a cuboid.

5. The method according to claim 1, wherein reference teeth are selected from the teeth of the patient and first surface elements associated with the reference teeth are selected as third surface elements, the second surface elements arranged within the bounding volume of the reference teeth are selected as fourth surface elements, and the old model is aligned in the current state model so that the third surface elements from the old model associated with the reference teeth have a minimum deviation determined by an interactive closest point algorithm from the fourth surface elements from the scan in order to perform the first alignment.

\* \* \* \* \*